United States Patent [19]
Malin

[11] 3,783,451
[45] Jan. 8, 1974

[54] INSECT PROTECTIVE GARMENT

[76] Inventor: Eugene F. Malin, 1040 Bayview Dr., Suite 201, Fort Lauderdale, Fla. 33304

[22] Filed: Dec. 20, 1972

[21] Appl. No.: 316,676

Related U.S. Application Data

[63] Continuation of Ser. No. 138,677, April 29, 1971, abandoned.

[52] U.S. Cl. .................................. 2/4, 2/DIG. 1
[51] Int. Cl. ............................................ A42b 3/00
[58] Field of Search ................. 2/4, 22, DIG. 1; 5/362, 363, 364; 161/148

[56] References Cited
UNITED STATES PATENTS

| | | | |
|---|---|---|---|
| 2,074,390 | 3/1937 | Green | 2/4 X |
| 2,028,947 | 1/1936 | Palm | 2/4 X |
| 2,924,455 | 2/1960 | Brunel | 161/148 X |
| 3,191,185 | 6/1965 | Martin | 2/22 |

FOREIGN PATENTS OR APPLICATIONS

| | | | |
|---|---|---|---|
| 489,382 | 9/1918 | France | 2/4 |
| 825,256 | 12/1959 | Great Britain | 2/DIG. 1 |

*Primary Examiner*—James R. Boler

[57] ABSTRACT

An insect protective garment for use in a warm climate comprising an insect netting material coupled to skin separating members such as, circular rings or elongated rib members which hold the netting material off the users skin to prevent mosquitoes from reaching or making contact with the skin of the wearer. Insects adjacent the net area are unable to reach the skin, while the garment provides sufficient air flow through the net and about the wearer's skin.

6 Claims, 6 Drawing Figures

PATENTED JAN 8 1974  3,783,451

EUGENE F. MALIN
INVENTOR.

INSECT PROTECTIVE GARMENT

This is a continuation of application Ser. No. 138,677, filed Apr. 29, 1971, now abandoned.

BACKGROUND OF THE INVENTION

This invention relates to garments that prevent insects and small pests from contacting the epidermis layer of the wearer's skin. In the past, insect protective garments have not worked successfully because they were either too thick which reduced air circulation about the skin area making them impossible to wear or at best very uncomfortable in warm climates or they allowed the insects to contact the skin. Applicants' invention provides a garment that prevents insect contact with the skin of the wearer while allowing the free-flow of air to the skin.

BRIEF DESCRIPTION OF THE INVENTION

A garment for the prevention of insect contact with the skin of the wearer comprising an insect netting through which insects cannot penetrate but which allows gaseous flow coupled to a plurality of elongated rib members spaced apart for contacting the skin or outer garment of the wearer which holds the netting above the skin at a sufficient distance to prevent insects adjacent said netting from reaching said skin. The garment may be in sections and shaped to fit various portions of the human body or could be used on animals.

It is an object of this invention to provide an insect protective garment.

It is another object of this invention to provide an insect protective garment that may be comfortable when worn in hot climate.

And yet another object of this invention is to provide a garment that is held away from and out of contact with the skin of the wearer by supporting ribs.

In accordance with these and other objects which will be apparent hereinafter, the instant invention will now be described with particular reference to the accompanying drawings.

BRIEF DESCRIPTION OF THE DRAWINGS

In the drawings:

FIGS. 3A, 3B and 3C show various support structures for use in Applicants' invention.

PREFERRED EMBODIMENT OF THE INVENTION

Figure 1A:
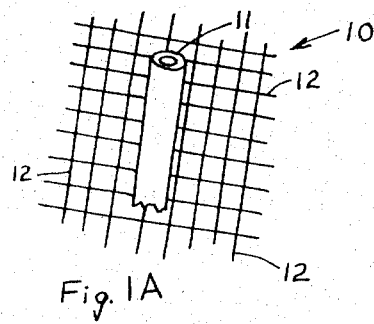
FIG. 1 is an enlarged segment of Applicants' garment in perspective.
Figure 1B:
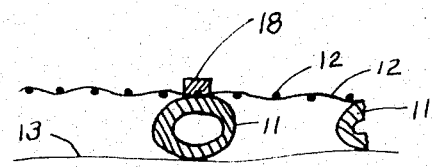

Referring now to the drawings and in particular to FIG. 1, a segment of Applicants' invention is shown. The basic garment is comprised of strands of netting 12 woven such as to prevent insects from passing between adjacent threads 12 and a structural skin separating tube 11 firmly coupled to the netting 12 by an adhesive or other thread means. The purpose of the tube is to hold the netting away from the skin, thus the tube thickness in diameter or a projecting length should be sufficient to prevent an insect from touching the skin. The tube 11 is coupled on the inside of the netting next to the wearer of the garment and the tube does contact the skin 13. FIG. 1B shows how the tubes 11 prevent netting material 12 from touching the skin 13.

Figure 2A:
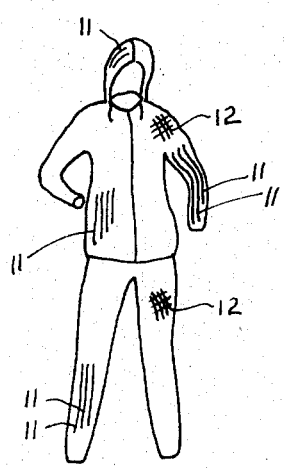
FIGS. 2A and 2B show Applicants' invention embodied in shirt-styled garment.

FIG. 2A shows an entire garment such as a jacket constructed of insect netting material 12 coupled to tubular elements 11. In this embodiment the tubular members are parallel in the sleeve, neck and torso portions.

Figure 2B:
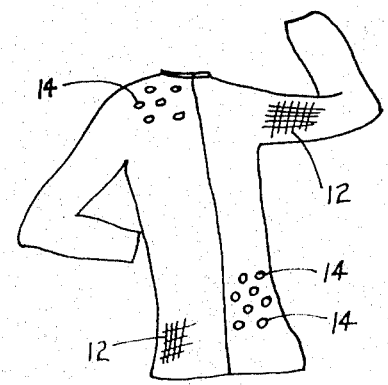

FIG. 2B shows an alternative embodiment of Applicant's invention in which a plurality of separating blocks 14 replace the tube members 11 shown in FIG. 2A. The separating blocks are coupled on the inside (next to the wearer's skin) of netting 12 and again serve to hold the netting 12 away from the skin surface of the wearer.

Figure 3A:
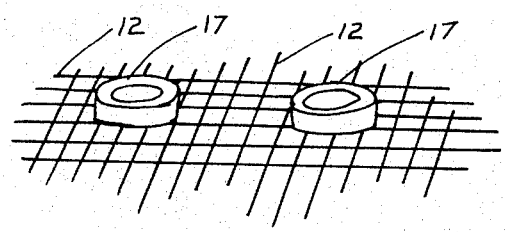

FIG. 3A shows flexible separating rings 17 which prevent skin contact of the netting 12 and which are spaced a sufficient distance apart to allow freedom of movement by the wearer and allows air to contact a substantial portion of the wearer's body. The rings may be made from plastic tubing. Or foamed plastic may be used to reduce the weight of the garment. When synthetic netting is used, such as nylon, plastic rings may be attached by welding or dialectric welding or by other known methods.

Figure 3B:
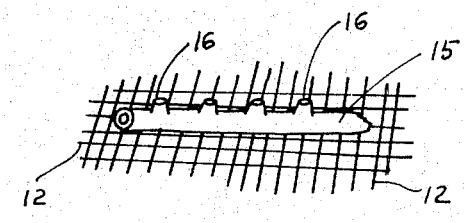

FIG. 3B shows another alternate embodiment using a blow-up tube 15 to control the diameter of the tube and the height of the projecting blow-up tits 16 that contact the wearer's skin. The tube 15 is connected to the garment and the tits contact the skin.

Any type of garment including shirt, pants, and hood may be made. The insect protective garment may be worn adjacent bare skin or over another light garment.

The separating elements may be coupled to the netting by standard methods such as sewing, heating until the element is fused to the net or glueing. Elastic means may be added to closed sleeve, neck, arm, cuff and waist openings.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A garment for protecting the skin of a wearer comprising:
   an insect net garment body portion; and
   a plurality of protruding means coupled to and spaced about one side of said net body portion, said side being the inside of said garment, each of said protruding means having an aperture disposed therethrough, and being of sufficient length to prevent an insect from contacting the skin of a wearer from the outside of said garment.

2. A garment as in claim 1, wherein: said protruding means is ring shaped.

3. A garment as in claim 2, wherein: said net is a mosquito net.

4. A garment for protecting the skin of a wearer from mosquitoes comprising;
   a mosquito net garment body portion having openings sized to prevent mosquitoes from passing through said mosquito net garment body and to allow air circulation through said mosquito net garment body,
   holding means for holding said mosquito net garment body portion off the skin of the garment wearer, said holding means directly connected to and over a length of said mosquito net garment, said holding means projecting a distance away from the inside of said mosquito garment toward the skin of a wearer to effectively keep a mosquito on an outside of net garment from making direct contact with the skin of the wearer adjacent the inside of said mosquito net garment, and a plurality of said holding means connected at various positions on said mosquito net garment and positioned in relation to each adjacent holding means to effectively keep mosquitoes from making contact with the skin of a user when the wearer's body is placed in various positions in relation to a horizontal plane, each said holding means forming a closed loop around a portion of said mosquito net garment body.

5. A garment for protecting the skin of a wearer from mosquitoes as set forth in claim 4 wherein;
said holding means is made of a plastic, generally resilient material.

6. A garment for protecting the skin of a wearer from mosquitoes as set forth in claim 4 wherein;
said holding means is an inflatable tube.

* * * * *